United States Patent [19]

Kondo

[11] 4,184,757
[45] Jan. 22, 1980

[54] EXPOSURE SERVO-CONTROL DEVICE FOR CAMERAS

[75] Inventor: Takashi Kondo, Sakai, Japan

[73] Assignee: Minolta Camera Kabushiki Kaisha, Osaka, Japan

[21] Appl. No.: 962,944

[22] Filed: Nov. 22, 1978

[30] Foreign Application Priority Data

Dec. 16, 1977 [JP] Japan .................. 52-168267[U]

[51] Int. Cl.² .............................................. G03B 7/08
[52] U.S. Cl. ........................................ 354/43; 352/141
[58] Field of Search ................... 354/40, 41, 42, 43, 354/44, 59, 60 A, 271; 352/141

[56] References Cited

U.S. PATENT DOCUMENTS

| 3,421,812 | 1/1969 | Kubota | 352/141 |
| 3,840,295 | 10/1974 | Suzuki | 354/43 X |

Primary Examiner—Michael L. Gellner
Attorney, Agent, or Firm—Watson, Cole, Grindle & Watson

[57] ABSTRACT

An exposure servo-control device for a camera prevents diaphragm overshoot by a simple damping construction including a mechanical switch or a semiconductor switching element which intermittently short-circuits a driving coil of an ammeter coupled to the diaphragm. A bridge circuit including a photoelectric element such as a CdS cell for receiving light flux from an object through the diaphragm aperture produces an output dependent on the deviation from an optimum aperture for the object to the presently positioned aperture. This output is amplified by an amplifier and input to the ammeter such that the driving coil drives the diaphragm to the optimum aperture. The damping of the diaphragm drive is caused by a counter-electromotive force generated in the driving coil each time the driving coil is short-circuited, and also by the inertia of movable portions of the diaphragm and the ammeter forced to stop during each period of time in which the driving coil is short-circuited. The period of time during which the driving coil is short-circuited may be controlled in accordance with the absolute value of the deviation, so that the greater the deviation, the shorter the period of time to enable faster adjustment of the diaphragm.

8 Claims, 6 Drawing Figures

EXPOSURE SERVO-CONTROL DEVICE FOR CAMERAS

BACKGROUND OF THE INVENTION

1. Field of the Invention

This invention relates to diaphragm aperture exposure servo-control devices for cameras, and in particular to such devices incorporating damping for preventing transient effects caused by diaphragm overshoot.

2. Prior Art

Known exposure servo-control devices control the diaphragm aperture by driving the diaphragm blades in association with the movement of the movable coil or magnet of an ammeter responsive to the output of a photosensitive element. In such an exposure servo-control device, however, when the brightness of the object to be photographed suddenly changes immediately before exposure, the inertial force of the movable element including the movable coil or magnet results in an overshoot of the diaphragm and produces the so-called transient effect. Such a transient effect presents a serious problem particularly in the case of cinematographic cameras. To prevent such an overshoot, it has been proposed, for instance, to incorporate a feedback or damping coil in juxtaposition with a driving coil in the exposure servo-control device to ensure an appropriate damping characteristic. Such damping coil devices are disclosed in U.S. Pat. Nos. 3,747,487 and 3,896,461. But such an arrangement has the disadvantage of complicated construction and high production cost.

SUMMARY OF THE INVENTION

The object of this invention is to overcome the above-mentioned disadvantages of the prior art servo-control devices, and to thereby provide exposure servo-control devices for cameras which are simple in construction and, yet, capable of preventing overshooting of the diaphragm.

The exposure servo-control device according to this invention is characterized in that a damping characteristic is imparted by intermittent short-circuits between both terminals of a driving coil. If the driving coil is short-circuited, a counter electromotive force is generated in the driving coil to immediately stop the movable element. However, even if the short-circuit of the driving coil is released, the movable element tends to stand still in position due to its inertia. This phenomenon is utilized in this invention to prevent an overshoot of the diaphragm of a photographic system.

The above simple construction has the advantage that it not only permits arresting of camera diaphragm overshoot, but, through a variation of the duty cycle, i.e. the relation between the time during which a signal current corresponding to the intensity of light incident on a photosensitive element through the diaphragm aperture flows through the driving coil of an ammeter and the time during which the two terminals of the same driving coil remain short-circuited, permits varying the responsiveness of the device. Moreover, when there has been a significant change in the current flowing through the driving coil of the ammeter, that is when a sharp alteration has occurred in the object brightness, the time-ratio of the signal current flowing through the ammeter may be increased to improve the responsiveness of the device. Conversely, when the current flowing through the driving coil of the ammeter diminishes, the time-ratio of the short-circuit may be increased to reduce the responsiveness so that the actual motion of the diaphragm is controlled to arrest an overshoot.

BRIEF DESCRIPTION OF THE DRAWINGS

FIGS. 3A and 3B show another exposure servo-control device according to this invention, wherein FIG. 3A is an exploded perspective view showing the mechanical construction of the device, and FIG. 3B is a circuit diagram therefor;

DETAILED DESCRIPTION OF THE PREFERRED EMBODIMENTS

Figure 1:
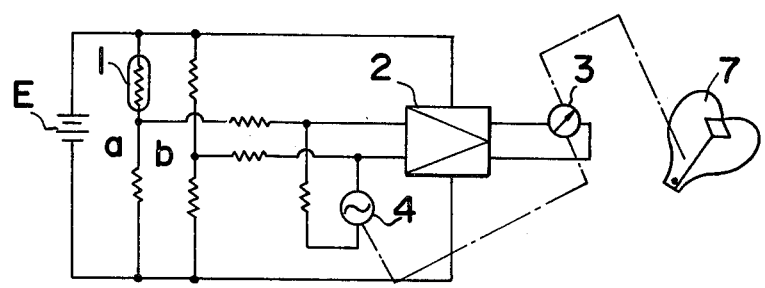
FIG. 1 is a block circuit diagram illustrating a schematic construction of a known exposure servo-control device intended to prevent overshoot of the diaphragm.

Before describing the embodiments of this invention in detail, a brief review of the conventional exposure servo-control device previously referred to is necessary. Referring to FIG. 1, the prior art device essentially comprises photoelectric element 1 which may for example be a CdS cell, amplifier 2, ammeter 3 which is used as an exposure meter, power generator 4 which is connected to the movable element of the ammeter, and diaphragm blades 7 which are actuated by ammeter 3.

More particularly, photoelectric element 1 constitutes one of the branches of a resistance bridge circuit, and the output of the bridge circuit is connected to the input terminal of amplifier 2. The output of amplifier 2 is connected to ammeter 3, the movable element of which is associated with the diaphragm blades 7.

The potential difference is generated between the outputs a and b of the bridge circuit and is input to amplifier 2 where it is amplified to a sufficient voltage to drive ammeter 3 and, thereby to drive diaphragm blades 7. Photosensitive element 1, on which the light transmitted through the aperture defined by diaphragm blades 7 is incident, constitutes a servo-mechanism, and ammeter 3 is driven until the difference in voltage between outputs a and b of the bridge circuit becomes null and, then, remains quiescent.

In the above arrangement, because amplifier 2 has a sufficient amplification range to increase the accuracy of ammeter 3, a sudden change in brightness of the photographic object, due to a change of weather or a change in location, causes the generation of a high voltage between terminals of the ammeter coil, which is the product of the output of the bridge circuit and the amplification factor, thereby starting to drive diaphragm blades 7 at a high rate of acceleration. However, the diaphragm blades continue to move beyond the optimum aperture by their inertia, giving rise to an overshoot.

To prevent the overshoot, the device shown in FIG. 1 includes power generator 4 connected to the movable element of ammeter 3 and the generated voltage of power generator 4 at the time of rotation of the movable element of ammeter 3 is applied to the input side of amplifier 2, the voltage being of a polarity cancelling the input voltage from the bridge circuit, whereby the speed of motion of diaphragm blades 7 is reduced to prevent overshoot of the diaphragm.

The preferred embodiments of this invention will hereinafter be described with reference to the drawings in which like parts or functionally equivalent parts are designated by like reference numerals.

Figure 2:
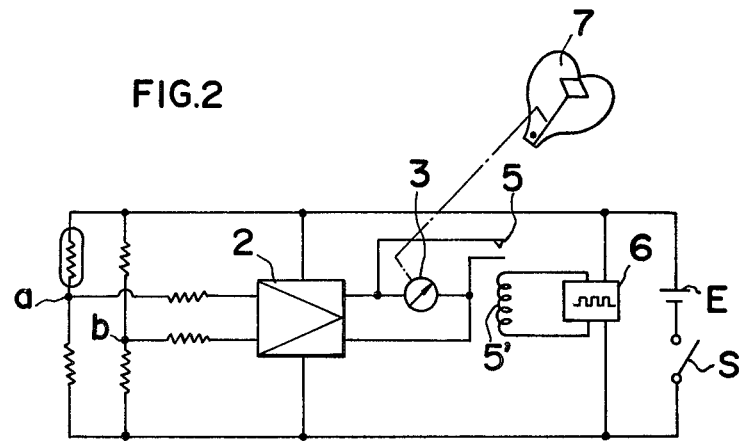
FIG. 2 is a circuit diagram representing the elemental construction of an exposure servo-control device embodying the principles of this invention.

In a first embodiment which is illustrated in FIG. 2, the two terminals of ammeter 3 are connected to relay switch 5, and pulse generator 6 energizes relay coil 5'. Pulse generator 6 is connected to power source E through switch S which is closed by exposure triggering. Upon closure of switch S, pulse generator 6 repeatedly energizes relay coil 5' for a predetermined time for each pulse to close relay switch 5 and de-energize relay coil 5' for the predetermined time of each pulse to open relay switch 5. Preferably, the cycle of the pulses generated by pulse generator 6 is preset at the fastest possible cycle within the range of response of relay switch 5.

In the above arrangement, the two terminals of ammeter 3 are short-circuited for a given time and, then, are connected to the output of amplifier 2 for a given time. This sequence of actions is repeated. Now, if the brightness of the object to be photographed undergoes a sudden change, the output of amplifier 2 tends to drive the movable element of ammeter 3 in response to the change, but since the two terminals of ammeter 3 are periodically short-circuited by the aforesaid pulses, the movable element of ammeter 3 tends to remain stationary during each short-circuit interval. Therefore, the movable element of ammeter 3 rotates at the proper speed and does not overshoot.

Figure 3A:
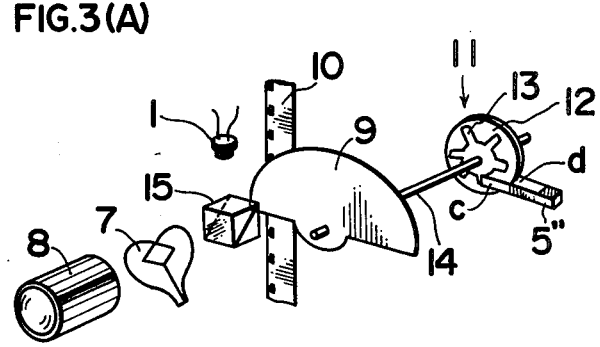
Figure 3B:
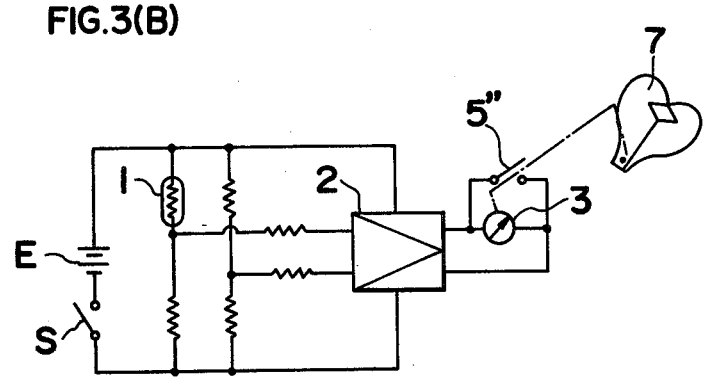

FIGS. 3A and 3B show a second embodiment of this invention as applied to a motion picture camera, where the periodic short-circuit between terminals of ammeter 3 is mechanically accomplished, in lieu of the use of the pulse generator 6 and relay switch 5 of the FIG. 2 embodiment. Thus, as shown in FIG. 3A, the light flux passing through objective lens system 8, the aperture defined by diaphragm blades 7, and also through beam-splitting prism 15 produces an image of the object on film 10 positioned behind the aperture. The motion picture camera is provided with revolving shutter blade 9 which is adapted to interrupt the projection of the light flux on film 10 while the film is intermittently transported with respect to the aperture, such that the light flux is only transmitted while film 10 is stationary. Disc 11 is coaxially and rigidly mounted on rotating shaft 14 of revolving shutter blade 9 so that the disc and shaft rotate as a unit. Disc 11 is formed with electrically conductive part 13 around the center of rotation of shaft 14, for example with respect to insulating plate 12, electrically conductive part 13 extending radially as shown. Beam-splitting prism 15 distributes the light flux passing through objective lens system 8 and the aperture defined by diaphragm blades 7 to film 10 on the one hand, and to a finder system on the other hand so that a portion of the light flux is incident on photosensitive element 1 disposed in the viewfinder system. Shaft 14 constitutes a known part of a camera drive means.

As shown in FIG. 3B, in the same manner as the embodiment depicted in FIG. 2 and described above, short-circuit means 5" is formed between the two terminals of ammeter 3 to the input of which is fed the output of amplifier 2. One contact d formed at the ends of short-circuit means 5" is in sliding contact with central conductive part 13 of disc 11, while the other contact point c is in sliding contact with the peripheral portion of disc 11, i.e. alternatingly with insulation part 12 and conductive part 13. In the above arrangement, as shutter blade 9 is driven for photographing, disc 11 is also rotated, with the result that short-circuit means 5" is closed and opened at a given frequency, whereby ammeter 3 is controlled as in the embodiment shown in FIG. 2.

While the fundamental construction of this invention has been described above, it should be understood that the speed of motion of diaphragm blades 7 can be varied by changing the duty cycle of the open and closed status of short-circuit means 5 or 5". Thus, the longer the time during which the short-circuit means remains closed, the slower the motion of the diaphragm blades and, conversely, the shorter the closed time, the faster the motion.

Figure 4:
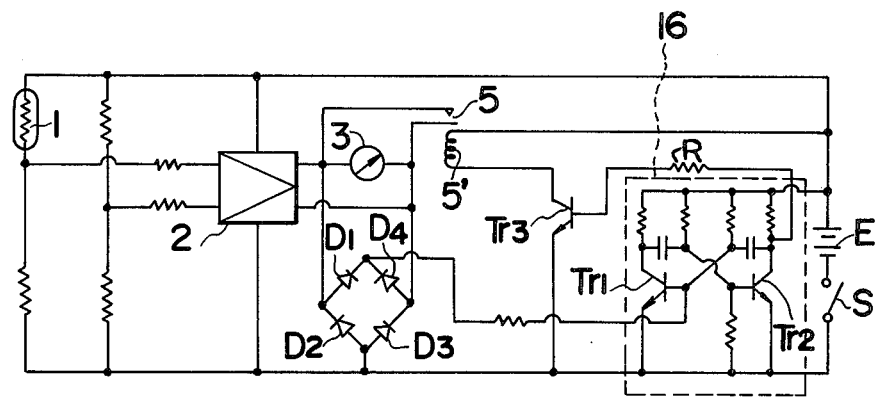
FIG. 4 is a circuit diagram showing a third exposure servo-control device having improved responsiveness according to this invention.

FIG. 4 shows a third embodiment of this invention which is designed to prevent overshoot based on the above principle, i.e. by varying the duty cycle of pulses from the pulse generator in accordance with the amount of deviation of the aperture setting. Thus, if the input voltage of ammeter 3 from the amplifier 2 rises, the relative feeding time or time-ratio of drive current from amplifier 2 to ammeter 3 is increased and, conversely, when the voltage across the ammeter terminals drops, the time-ratio of the short-circuit between terminals of ammeter 3 is increased. Thus, in the former case, the responsiveness of ammeter 3 is improved so that it starts moving rapidly to enable diaphragm blades 7 to approach the optimum aperture rapidly. In contrast, in the latter case, the responsiveness of ammeter 3 is decreased and, as the optimum aperture is approached, the motion of the diaphragm blades is decelerated.

A couple of transistors $Tr_1$ and $Tr_2$ in a control circuit constitute a non-stable multivibrator 16. The collector of transistor $Tr_2$ is connected to the base of transistor $Tr_3$ through resistor R, whereby the on-and-off actions of transistor $Tr_3$ are controlled. Relay coil 5' is connected to the collector of transistor $Tr_3$.

When a voltage appears between the two terminals of ammeter 3 and a current flows therethrough, the current is rectified by diodes $D_1$, $D_2$, $D_3$ and $D_4$ and, at the node between diodes $D_1$ and $D_4$, a voltage is generated which corresponds to the absolute value of the current flowing through ammeter 3. This voltage is input to the base of transistor $Tr_1$.

If the voltage at the above-mentioned node between diodes $D_1$ and $D_4$ rises, the cut-off time of transistor $Tr_1$ is reduced, the energization time of relay coil 5' is diminished, the ratio of the short-circuit time of short-circuit relay switch 5 of ammeter 3 is also reduced, and the speed of motion of ammeter 3 is increased. Diaphragm blades 7 are accordingly driven rapidly, but as they approach the optimum aperture, the terminal voltage of ammeter 3 drops, with the result that the base bias of transistor $Tr_1$ drops to prolong the closed-time of relay switch 5. Accordingly, the speed of motion of ammeter 3 is gradually reduced so that the aperture defined by diaphragm blades 7 becomes closer to the optimum aperture until blades 7 are stopped in the proper position without an overshoot.

Figure 5:
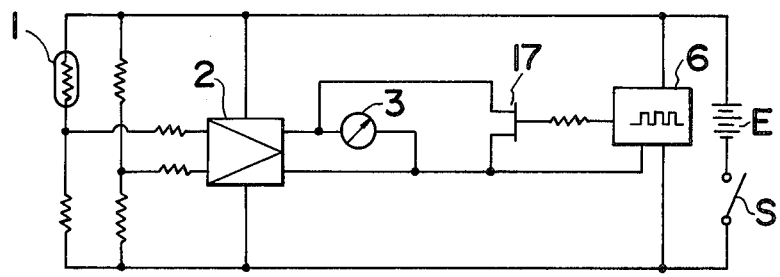
FIG. 5 is a circuit diagram showing a fourth exposure servo-control device embodying the principles of this invention.

The embodiment shown in FIG. 5 is similar to the embodiment of FIG. 2 in that the ratio of short-circuit time is not variable. However, the open-and-close actions of the short-circuit means are accomplished by semiconductor switching element 17, to a gate of which is fed the output pulse of pulse generator 6.

It should now be apparent that while the second embodiment shown in FIG. 3 is applied to a motion picture camera provided with an exposure meter of the type which performs TTL (through the lens) light measurement, a similar device may be applied to a still camera as well. Furthermore, the exposure meter is not necessarily limited to the TTL type but it may be of the external light measurement type. Thus, this invention is also applicable to a servo-type exposure meter having an auxiliary diaphragm associated with the diaphragm of the photographing optical system.

As it apparent from the various embodiments described above, the exposure servo-control device according to this invention offers a significant practical advantage in that it controls the diaphragm without overshooting by the simple contrivance that the two terminals of the driving coil of the aperture-controlling ammeter are intermittently short-circuited.

What is claimed is:

1. An exposure servo-control device for a camera having a shutter and an adjustable diaphragm for regulating the amount of light impinging on the film, said device comprising:
    an electric circuit for generating an output dependent on the deviation from an optimum aperture for an object to be photographed to the present instantaneous diaphragm aperture;
    an electromagnetic device including a driving coil across which said output is applied for excitation thereof, said electromagnetic device driving said diaphragm by the electromagnetic force caused by the excitation of said driving coil;
    switch means for short-circuiting said driving coil; and
    control means for intermittently actuating said switch means so that said driving coil is intermittently short-circuited.

2. An exposure servo-control device as in claim 1, wherein said electric circuit includes a photoelectric element disposed to receive light from the object through the present instantaneous diaphragm aperture and circuit means responsive to said photoelectric element for generating said output.

3. An exposure servo-control device as in claim 1, wherein said control means includes a pulse generator and said switch means is responsive to the pulses from said pulse generator.

4. An exposure servo-control device as in claim 3, wherein said control means further includes a relay coil intermittently excited by the pulses from said pulse generator; and said switch means includes a mechanical switch responsive to the excitation of said relay coil for intermittently short-circuiting said driving coil.

5. An exposure servo-control device as in claim 3, wherein said switch means includes a semiconductor switching element intermittently made conductive to short-circuit said driving coil in response to the pulses from said pulse generator.

6. An exposure servo-control device as in claim 3, wherein said pulse generator generates pulses of a predetermined constant duty cycle.

7. An exposure servo-control device as defined in claim 3, wherein said control means further includes circuit means for generating a control signal dependent on the absolute value of said output and circuit means for varying the duty cycle of the pulses from said generator such that the greater the absolute value of said output, the shorter the period of time during which said drive circuit is short-circuited.

8. An exposure servo-control device as in claim 1, further comprising means for driving said camera for repeated photographing, and wherein said control means includes a member interlocked with said camera driving means for intermittently actuating said switch means.

* * * * *